June 22, 1948.  C. W. STOOPS  2,443,644
THYRATRON CONTROL SERVO AMPLIFIER
Filed Sept. 17, 1945  2 Sheets-Sheet 1
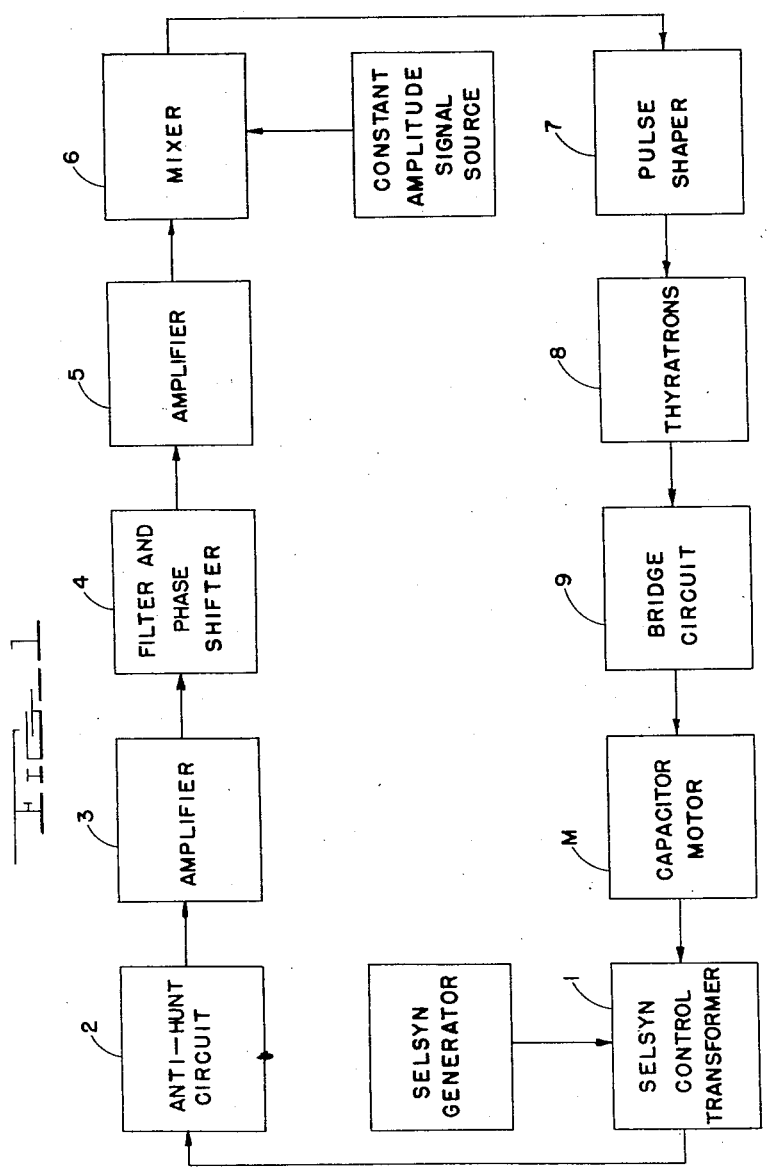
Inventor
CHESTER W. STOOPS
By Ralph L. Chappell
Attorney June 22, 1948.  C. W. STOOPS  2,443,644
THYRATRON CONTROL SERVO AMPLIFIER
Filed Sept. 17, 1945  2 Sheets-Sheet 2
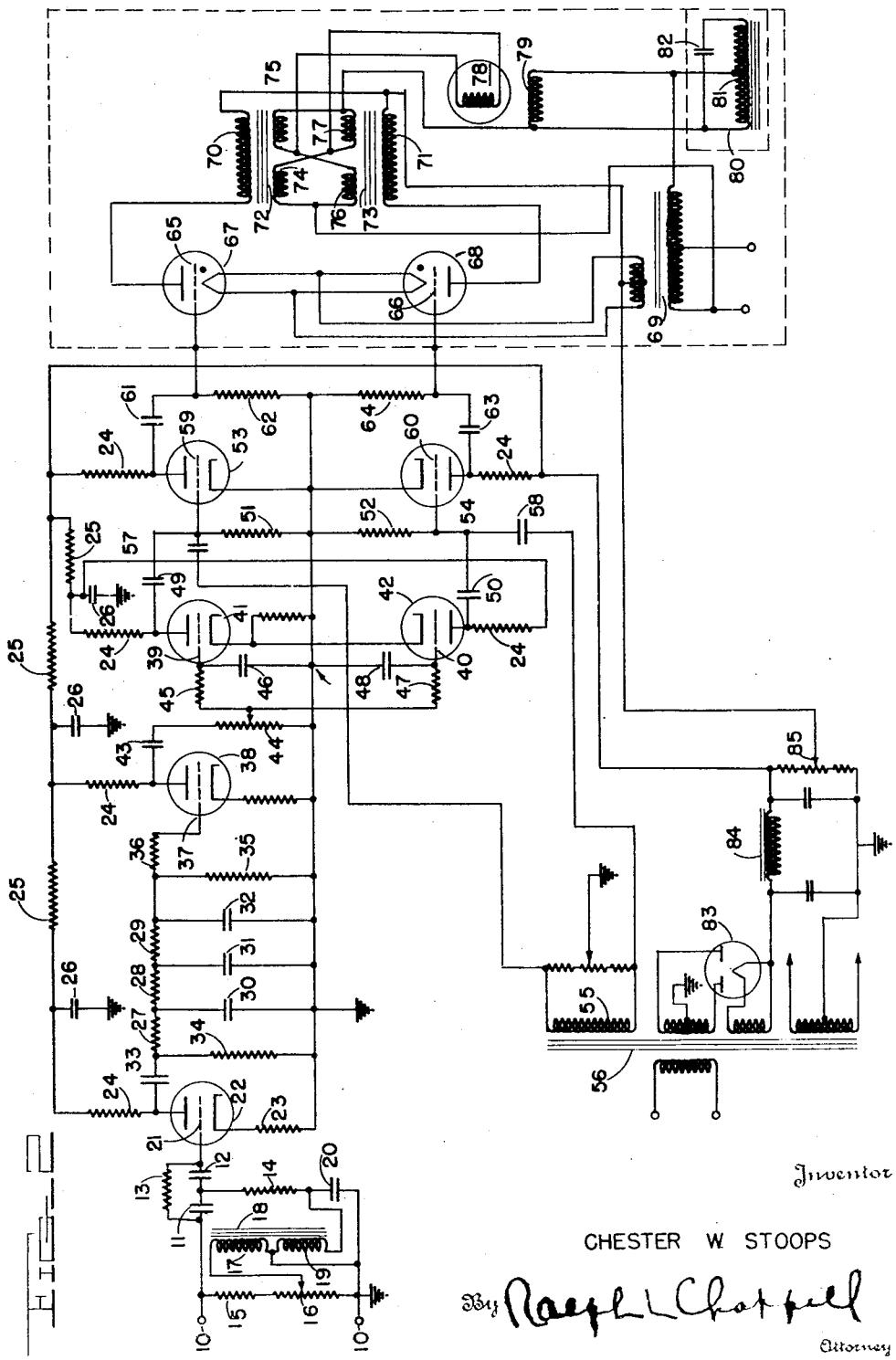
Inventor
CHESTER W. STOOPS
By Ralph L. Chappell
Attorney Patented June 22, 1948

2,443,644

UNITED STATES PATENT OFFICE 2,443,644

THYRATRON CONTROL SERVO AMPLIFIER

Chester W. Stoops, Washington, D. C.

Application September 17, 1945, Serial No. 616,943

5 Claims. (Cl. 318—30)

(Granted under the act of March 3, 1883, as amended April 30, 1928; 370 O. G. 757)

This invention relates to servo systems and, more particularly, to an electronic control system for moving the rotor shaft of an A. C. motor or a load driven by the rotor shaft to an angular position corresponding to that of a movable control member or input shaft.

Systems of this type generally operate by deriving a control voltage related to the difference in the positions of the two shafts and using this voltage to control a driving motor so as to move the rotor shaft to a position corresponding to that of the input shaft. One known method of accomplishing this as shown in Patent No. 2,363,342, granted November 21, 1944, to Robert N. Lesnick, is to feed the output error signal of a conventional "Selsyn" control transformer into a grid control rectifier or balanced modulator, where the voltage is compared in phase with the A. C. line voltage, producing a unidirectional voltage having a polarity related to the direction of the displacement and a magnitude related to the extent of displacement. This voltage is amplified and applied to a power stage to energize a two-phase motor so as to drive the output shaft of the motor toward a position corresponding to that of the input shaft coupled to the control transformer. This system is somewhat limited in its application, however, due to the fact that a different amplifier is required for each different size motor circuit employed.

The present invention provides an amplifier which will drive thyratrons for any of the currently available low inertia two phase motors, rendering it applicable as a control system for a wide variety of loads. The present invention further provides a novel anti-hunt circuit in the control system to make the drive motor more accurately follow the variations of the control shaft.

In addition, the present invention provides a novel amplitude to phase modulation converter circuit by which the pair of output voltages from this circuit are varied in phase as a function of the amplitude of the input signal to give a more positive control of the firing time of a pair of thyratrons and thus critical control of the direction, speed and degree of rotation of a two-phase motor driven by the thyratrons.

Accordingly, one object of the invention is to provide a more universal type of amplifier for use in servo systems or the like.

Another object of the invention is to provide in a single unit a variable phase shifted control voltage suitable for use in connection with circuits employing various sizes of thyratron tubes operated with an alternating current plate voltage.

Another object of the invention is to provide a servo amplifier in conjunction with a thyratron control circuit and a two-phase drive motor giving a high degree of positive control of the movement of the motor shaft for accurately repeating the position of a control shaft.

Other objects will become apparent to those skilled in the art upon consideration of the following description, with reference to the drawing, in which only a preferred embodiment of the invention has been selected for purposes of illustration:

Fig. 1 is a block diagram of the servo system embodying the invention.

Fig. 2 is a circuit diagram of a thyratron control servo amplifier.

Referring to Fig. 1 of the drawing, the block diagram shows a "Selsyn" control transformer 1 coupled mechanically to the shaft of a capacitor or two phase motor M. When the axis of the rotor winding of the control transformer 1 is angularly displaced to one side or the other of a position at right angles to the magnetic field of the stator winding, a voltage is induced in the rotor winding having an amplitude depending upon that displacement and having a phase depending upon the direction of displacement, the two voltages being 180° apart in phase. This position error voltage is applied to an anti-hunt network 2 which comprises a modified bridged T-network, such as described and claimed in my copending application Serial No. 642,057, filed January 18, 1946, which is adjusted to attenuate the carrier frequency component of the error voltage and to pass the side-band components. The output voltage from the network 2 is fed to an amplifier stage 3 thence to a low pass filter and phase shifting circuit 4 whose output voltage is the input to the amplifier 5. This amplifier is composed of a conventional single-ended stage followed by a pair of amplifier tubes connected in parallel. The output of this stage is combined in the grid circuits of a mixer stage 6 with a pair of oppositely phased voltages obtained from a secondary winding of a transformer connected to the alternating current supply voltage. The output of this stage consists of a pair of voltages whose phases are advanced or retarded in time with reference to the voltages there present when the output of the stage is zero. An RC pulse shaper 7 produces a peaked voltage suitable for establishing a positive control of the instant of firing the thyratrons 8 of the control circuit. An increase in the plate current flowing through one of the thyratrons is accompanied by a decrease in the plate current of the other thyratron when the circuit is properly adjusted. So long as the plate currents are equal the bridge circuit 9 is balanced. When the plate currents are unequal, the balance of the bridge circuit is upset and current flows through the field winding of the capacitor motor M. The direction of rotation of the motor is determined by the direction of flow of current from the balance points of the bridge, which in turn is dependent upon which of the thyratrons is conducting more heavily. Thus the phase and amplitude of the error signal with respect to the constant amplitude signal controls the direction and speed of rotation of the two phase motor and the time duration of the error signal controls the degree of rotation of the rotor of the two phase motor.

Referring now to Fig. 2, an error signal voltage from the position control transformer, not shown, is applied to the terminals 10—10. This signal comprises a 60-cycle voltage of variable amplitude and may be regarded as being the resultant of a carrier frequency plus upper and lower sidebands in addition to harmonic frequencies. The bridged T-network consisting of condensers 11 and 12 and resistors 13 and 14 is designed to attenuate the carrier and to pass all the other component frequencies. A selected, variable portion of the input signal voltage appearing across the resistor 15 and potentiometer 16 is applied to the primary 17 of the step-down transformer 18. The ungrounded terminal of the secondary 19 is connected between resistor 14 and condenser 20, the other side of which is grounded. The use of the transformer as indicated provides a means of changing the relative amplitudes of the carrier and the sidebands so that the signal, appearing between the grid 21 of tube 22 and the ground has a higher sideband content than the original error signal. Since an increased ratio of side band voltage to carrier voltage appreciably reduces the hunting tendencies of the control system, and the potentiometer 16 controls this ratio, the rejection filter and phase inverting transformer provide a very effective anti-hunting circuit. In the cathode circuits of tubes 22, 38, 41 and 42 are provided unbypassed resistors, such as resistor 23 in the cathode circuit of tube 22, to bias the tubes so that they operate as linear amplifiers. The plate circuit includes the load resistor 24 and a stage isolating filter consisting of resistor 25 and condenser 26, these elements also occurring in subsequent stages to perform the same functions and are consequently designated by the same reference numerals.

The output of the amplifier tube 22 is fed to the four-terminal network including resistors 27, 28 and 29 and the condensers 30, 31 and 32 through the circuit comprising condenser 33 and resistor 34. The output terminals of the four-terminal network are bridged by a resistor 35. A resistor 36 in series with the input to the grid 37 of tube 38 prevents damage to the grid arising from positive excursions of the input voltage. This network produces a phase sihft in the signal voltage and serves as a low pass filter removing the harmonics of the 60-cycle carrier voltage.

A variable portion of the output of tube 38 is fed to the grids 39 and 40 of the tubes 41 and 42 through coupling condenser 43 and potentiometer 44, the exact amount being determined by the setting of the potentiometer 44. The resistor and condenser combinations 45, 46 and 47, 48 further shift the phase of the amplified signal voltage. The output voltages of the tubes 41 and 42 are in phase and are coupled through condensers 49 and 50 to produce in-phase voltage drops across the resistors 51 and 52 in the grid circuit of tubes 53 and 54. A 60-cycle voltage of substantially constant amplitude derived from the winding 55 of the power transformer 56 through coupling condensers 57 and 58 causes out of phase voltages to be developed across resistors 51 and 52. These latter voltages are 180° out-of-phase with one another and roughly 90° out-of-phase with the voltages from the tubes 41 and 42. The resultant voltages between the grids 59 and 60 of tubes 53 and 54 and the ground are therefore out of phase with the voltages there existing when the outputs of tubes 41 and 42 are zero due to vector addition of these voltages in the grid circuit. The phase shift will be of such character that the new voltage is leading in the case of one of the tubes and lagging in the case of the other. Whether the voltage will be made leading or lagging in any instance will depend upon phase of the error signal voltage, a 180° phase shift in this voltage accompanying a change in the relative position of the rotor of the control transformer to one side or the other of its correct position. Since a small change in the amplitude of the error signal produces an appreciable change in the phase of the output of this stage, extremely accurate control of the average thyratron currents and thus of the motor torque is obtained.

The output of tubes 53 and 54 is fed through RC peaker circuits comprising capacitors 61, 63 and resistors 62, 64 to grids 65 and 66 of thyratron tubes 67 and 68. This error voltage is peaked to give accurate positive control of the instant of firing of the thyratrons. The phase and amplitude of this error voltage with respect to the phase and amplitude of the 60-cycle A. C. plate voltage applied to the thyratron tubes from transformer 69 through transformers 72 and 73 determines the instant in the plate voltage cycle at which the thyratrons will conduct, and thus the average current flow through the thyratrons. Connected in series with the thyratron tubes 67, 68 are coils 70 and 71 of transformers 72 and 73. A bridge circuit for controlling the direction of rotation of the two-phase drive motor is provided comprising coils 74, 75 forming the secondary of transformer 72 in the plate circuit of tube 67 and coils 76, 77 forming the secondary of transformer 73 in the plate circuit of tube 68. Coils 74, 75, 76 and 77 are all connected in series to form an inductance bridge. Field winding 78 of the two phase motor is connected across one diagonal of the bridge, and the other field winding 79 is connected in series with the A. C. line through the primary of transformer 69 to the other diagonal. A condenser transformer 80 comprising transformer coil 81 and condenser 82 is shunted across field winding 79 to provide the necessary phase shift in winding 79, respective to the phase of the current in winding 78, for proper two phase operation.

As long as the currents flowing in the coils 70 and 71 of the transformers 72 and 73 are identical, the inductances in the bridge circuit are equal, the points to which the leads to field winding 78 are connected are equipotential points, and no voltage is applied between the terminal of the winding. Under these conditions, the rotor of the two phase motor remains at rest. An increase in the current through coil 70 reduces the inductance of coils 74 and 75 and upsets the balance of the bridge with the result that a current is caused to flow through the field winding 78 of the motor. An increase in the current through the coil 71 would have caused an unbalance voltage 180° out of phase with the unbalance voltage due to an increase of current in coil 70. This voltage would cause the direction of rotation of the rotor to be reversed. Thus the phase difference of the outputs of mixer tubes 53 and 54, in determining the instant of firing of the thyratrons 67 and 68, determines the relative current flow in coils 70 and 71 and thus the direction of rotation of the two phase motor.

Also shown in Fig. 2 is a conventional power supply comprising power transformer 56, full-wave rectifier tube 83, filter network 84 and load potentiometer 85 to convert the 60-cycle A. C. input to the power transformer 56 into the D. C. plate voltage required for the amplifier and mixer stages. The plate supply for these stages is tapped off of the ungrounded end of load potentiometer 85, while a variable D. C. voltage is taken off of the movable arm of the potentiometer 85 to be added to the A. C. voltage in the secondary of transformer 69 to be applied to the plates of the thyratrons 67 and 68, thus to control the duty cycle of the thyratrons.

Various modifications may be made in the invention without departing from the spirit and scope thereof, and it is desired, therefore, that only such limitations shall be placed thereon as are imposed by the prior art and are set forth in the appended claims.

The invention described herein may be manufactured and used by or for the Government of the United States of America for governmental purposes without the payment of any royalties thereon or therefor.

What is claimed is:

1. In a position control amplifier for a capacitor motor, a Selsyn control transformer coupled to the shaft of said motor, a modified bridged T-network with a variable feedback circuit, said modified T-network being designed to suppress the carrier voltage output of said control transformer to a variable extent and to pass the sideband voltages, a low pass filter and phase shifting circuit, an amplifier having a variable gain, mixing circuits for combining the output of said amplifier in a pair of circuits with a pair of oppositely phased voltages of substantially constant amplitude, the outputs of said mixing circuits being shifted in phase by variable amounts depending upon the amplitude of the voltages derived from the variable gain amplifier, RC circuit means peaking the said phase shifted voltages, means varying the no-signal bias voltage for a pair of thyratron tubes, means coupling the peaked and phase shifted voltages to the grids of said thyratron tubes, inductance loads in the plate circuits of said thyratrons, an inductance bridge having one pair of opposing arms coupled inductively to one of said inductance loads, the other pair of opposing arms being coupled inductively to the other of said inductance loads, on phase winding of said capacitor motor being connected across the output terminals of said bridge circuit, the other phase winding of said motor being connected in series with the input to said bridge, and Selsyn generator means for selecting the desired position of said motor shaft.

2. In a control amplifier for a two phase motor, a Selsyn control transformer coupled to the shaft of said motor, anti-hunt circuit means including a rejection filter and a variable feedback circuit, said feedback circuit comprising a variable potentiometer, a phase inverting step-down transformer connected between the arm of said potentiometer and the lower end of said rejection filter, a condenser isolating the junction of said transformer and said rejection filter from ground, said circuit means being designed to suppress the carrier voltage output of said control transformer to a variable extent and to pass the side-band voltages, circuit means amplifying and shifting the phase of the output of the anti-hunt circuit, circuit means combining the output of the constant phase shifting means with substantially constant amplitude voltages differing in phase from each other and from said constant phase shifted output thereby producing variable phase shifted voltages whose phase variations are proportional to the amplitude variations of the voltage output of said control transformer, means applying said phase shifted voltages to the grid circuits of a pair of thyratrons having an alternating current supply voltage of said carrier frequency for controlling the power of the plate current pulses of said thyratrons, and bridge circuit means coupled to the output of said thyratrons and to the windings of said two phase motor to control the rotation of the shaft of said motor, said bridge circuit being responsive to the duration of the plate current pulses of said thyratrons.

3. In a control amplifier for a motor having a two-phase field, means controlling the rotation of the shaft of said motor, said means including an impedance bridge network arranged with one field winding of said motor connected across one pair of diagonals thereof, a source of alternating potential, means connecting said source of potential across the other field winding of said motor in series with the other pair of diagonals of said bridge network, means varying the impedances of opposing arms in said bridge thereby controlling the balance and unbalance condition thereof, said means comprising a pair of grid controlled gaseous discharge devices the plate circuits of which are inductively coupled to said bridge impedances in pairs, means controlling the plate current of said discharge devices, said means comprising a source of reference alternating potential, means splitting said reference source into phase opposed components, a control voltage of variable amplitude, said control voltage being in phase quadrature with said reference potential, means combining said control voltage with each of said phase opposed components of said reference potential whereby there is produced a pair of phase shifted components, and means applying each of said phase shifted components to the control grid of a respective one of said discharge devices.

4. In a position control system having an input shaft and an output shaft driven by a two-phase motor and means for producing an error signal whose phase and amplitude are dependent respectively on the sense and extent of miscorrespondence between said input and output shafts, a position control means, comprising a source of reference alternating potential, means splitting said alternating potential into phase opposed components, means combining said error signal with each of said phase opposed components to produce a pair of phase shifted voltages, including a frequency selective filter circuit arranged to attenuate the carrier frequency of said error signal and to pass the side-bands thereof, said last named means further including a phase shift circuit for producing quadrature phase relation between said pair of phase opposed components and said error signal, and means comprising a pair of gas discharge devices for controlling the direction and speed of movement of said two-phase motor responsive to said pair of phase shifted voltages.

5. In a position control system having an input shaft and an output shaft driven by a two-phase motor and means for producing an error signal whose phase and amplitude are dependent respectively on the sense and extent of miscorrespondence between said input and output shafts, a position control means, comprising a source of reference alternating potential, means splitting said alternating potential into phase opposed components, means combining said error signal with each of said phase opposed components to produce a pair of phase shifted voltages, including a frequency selective filter circuit arranged to attenuate the carrier frequency of said error signal and to pass the side-bands thereof, said last named means further including a phase shift circuit for producing quadrature phase relation between said pair of phase opposed components and said error signal, a pair of grid controlled gas discharge devices having an alternating plate supply therefor, means applying each of said phase shifted voltages to the grid of a respective one of said devices, said means operating to shape said voltages to produce a peaked wave form providing positive control of the instant of plate current flow in said discharge devices, and means responsive to the output of said discharge devices and coupled to said motor so as to drive the output shaft into positional agreement with said input shaft.

CHESTER W. STOOPS.

REFERENCES CITED

The following references are of record in the file of this patent:

UNITED STATES PATENTS

| Number | Name | Date |
| --- | --- | --- |
| 2,068,490 | Hull | Jan. 19, 1937 |
| 2,363,342 | Lesnick | Nov. 21, 1944 |
| 2,407,084 | Lavender | Sept. 3, 1946 |

FOREIGN PATENTS

| Number | Country | Date |
| --- | --- | --- |
| 489,271 | Great Britain | July 22, 1938 |